(12) United States Patent
Ebihara

(10) Patent No.: US 10,265,870 B2
(45) Date of Patent: Apr. 23, 2019

(54) COVER STRUCTURE OF ROBOT

(71) Applicant: FANUC CORPORATION, Minamitsuru-gun, Yamanashi (JP)

(72) Inventor: Kenzo Ebihara, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/205,523

(22) Filed: Jul. 8, 2016

(65) Prior Publication Data

US 2017/0008177 A1   Jan. 12, 2017

(30) Foreign Application Priority Data

Jul. 10, 2015   (JP) ................................. 2015-138588

(51) Int. Cl.
*B25J 19/00*   (2006.01)

(52) U.S. Cl.
CPC .......... *B25J 19/0075* (2013.01); *Y10S 901/49* (2013.01)

(58) Field of Classification Search
CPC .......... B25J 19/0075; B23Q 11/08; F16P 3/00
See application file for complete search history.

(56) References Cited

U.S. PATENT DOCUMENTS

| | | | |
|---|---|---|---|
| 2,336,557 A | 12/1943 | McCallister | |
| 4,132,497 A * | 1/1979 | Weller | B23Q 11/08 408/241 G |
| 4,904,514 A * | 2/1990 | Morrison | B25J 19/0083 414/728 |
| 5,306,999 A * | 4/1994 | Hoffman | B60L 11/1818 320/109 |
| 5,785,727 A * | 7/1998 | Mine | C03B 11/16 239/132.3 |
| 6,157,162 A | 12/2000 | Hayashi et al. | |
| 6,323,615 B1 | 11/2001 | Khairallah | |
| 6,708,956 B1 | 3/2004 | Mangelsen et al. | |
| 6,843,589 B1 | 1/2005 | Dhillon et al. | |
| 7,999,506 B1 | 8/2011 | Hollar et al. | |
| 8,393,362 B1 * | 3/2013 | Hollerback | B67D 7/0401 141/192 |
| 9,056,555 B1 | 6/2015 | Zhou | |
| 2001/0022109 A1 * | 9/2001 | Wenninger | B25J 19/0075 74/18 |

(Continued)

FOREIGN PATENT DOCUMENTS

| | | |
|---|---|---|
| CN | 104260605 A | 1/2015 |
| DE | 3532305 A1 | 3/1987 |

(Continued)

OTHER PUBLICATIONS

Notification of Reasons for Refusal for Japanese Application No. 2015-138588, dated Sep. 12, 2017 with translation, 8 pages.

(Continued)

*Primary Examiner* — Vicky A Johnson
(74) *Attorney, Agent, or Firm* — RatnerPrestia

(57) ABSTRACT

In a cover structure of a robot, the robot includes two or more movable portions, is stored in a cover, and is mounted with an end effector in any one of the two or more movable portions. The cover is fixed to any one of the movable portions other than the movable portion mounted with the end effector among the two or more movable portions, and has a cover opening portion where the end effector is capable of passing.

4 Claims, 5 Drawing Sheets

(56) References Cited

U.S. PATENT DOCUMENTS

2010/0028117 A1    2/2010  Nihei et al.
2012/0055595 A1*   3/2012  Schodowski ........ B25J 19/0075
                                                   150/154

FOREIGN PATENT DOCUMENTS

| EP | 1375088 A1    | 1/2004  |             |
|----|---------------|---------|-------------|
| FR | 2494163 A1 *  | 5/1982  | ........ B25J 9/04 |
| FR | 2626807 A1 *  | 8/1989  | ........ B25J 9/0012 |
| FR | 2924796 A1    | 6/2009  |             |
| GB | 2283804 A     | 5/1995  |             |
| JP | 60149681 A    | 8/1985  |             |
| JP | 61284285 A    | 12/1986 |             |
| JP | 62056095 A    | 3/1987  |             |
| JP | 6261485 U     | 4/1987  |             |
| JP | 01199788 A    | 8/1989  |             |
| JP | 2000092618 A  | 3/2000  |             |
| JP | 2010-36285    | 2/2010  |             |
| JP | 2011131335 A  | 7/2011  |             |
| WO | 2015139841 A1 | 9/2015  |             |

OTHER PUBLICATIONS

Notification of Reasons for Refusal for Japanese Application No. 2015-138588, dated Apr. 10, 2018, including English translation, 6 pages.

Japanese Notification of Reasons for Refusal for Japanese Application No. 2015-138588, dated Oct. 2, 2018 with translation, 12 pages.

* cited by examiner (a) AUTOMATIC DOOR IS CLOSED (b) AUTOMATIC DOOR IS OPENED (a) OPERATION AREA A SIDE (b) MACHINING AREA B SIDE (a) AREA IS PARTITIONED INTO TWO AREAS (b) AREA IS PARTITIONED INTO FOUR AREAS

COVER STRUCTURE OF ROBOT

BACKGROUND OF THE INVENTION

1. Field of the Invention

The present invention relates to a cover structure of a robot.

2. Description of the Related Art

A robot is used to carry a workpiece into a machine tool and to carry out the machined workpiece from the machine tool. A structure which protects the robot from a chip or a machining fluid is required in a case where the robot is used in an environment, such as a machining area of the machine tool, where the chip or the machining fluid scatters. For example, in a case where the robot automatically exchanges the workpiece of the machine tool, a system is generally configured such that a door separating the robot and the machining area is provided, the door is closed during machining, and the robot enters the machining area to exchange the workpiece when the door is opened after machining (see JP 2010-36285 A).

The door is necessary to be automatically opened and closed, and thus it is necessary to additionally prepare an actuator such as an air cylinder and to provide a control device such as an electromagnetic valve for driving the air cylinder through an electric signal sent from the robot or the machine tool. In addition, there is a risk that the robot collides with the door in a case where an erroneous operation occurs or the robot is operated more quickly than the opening/closing speed of the door.

In addition, a method in which the door is directly opened and closed by a hand of the robot can be adopted as another method of opening and closing the door. The actuator for opening and closing is not required in this case, but the method is not suitable for a high-speed motion by reason of the time loss according to an increase of the operation of the robot. In addition, there is still a possibility that an erroneous motion causes the robot to collide with the door.

FIGS. 1A and 1B illustrate a robot 1, which automatically exchanges a workpiece 13 mounted in a workpiece table 11 of a machine tool 7, and a structure of a door 4, which is automatically opened and closed, as an example of a conventional technology. The robot 1 is provided on an operation area A side, and includes an end effector 2 gripping the workpiece 13 at a fingertip. The operation area A and a machining area B are partitioned by a fixed wall 5. The door 4 is attached to the fixed wall 5, and is configured as an automatic door which can be opened and closed by an air cylinder 3. The machining area B of the machine tool 7 is blocked from the outside by the fixed wall 5 and the door 4.

The mechanical configuration of the machine tool 7 which machines the workpiece 13 is disposed in the machining area B. A tool main axis 9 is attached to a machine tool axis 8. Then, a tool 10 is mounted in the tool main axis 9. Reference numeral 12 indicates a scattered chip or cutting liquid 12 scattered when the workpiece 13 is machined. It is prevented that the chip or the cutting liquid is scattered toward the robot 1 in such a manner that the door 4 is closed as illustrated in FIG. 1A while the machine tool 7 machines the workpiece 13.

The door 4 is opened, and the robot 1 enters the machining area B as illustrated in FIG. 1B when the workpiece is exchanged after completing the machining. The air cylinder 3 is attached to the door 4, and air is supplied thereto (the device for supplying the air and the like are not illustrated) to open and close the door 4. A signal for opening and closing the door 4 is output from a control device (not illustrated) of the robot 1 or the control device (not illustrated) of the machine tool 7. For example, the electromagnetic valve (not illustrated) is controlled with the signal to switch the air to be supplied to the air cylinder 3 between ON and OFF.

A collision between an arm portion of the robot 1 and the door 4 occurs when the arm portion of the robot 1 enters the machining area B before the door 4 completely opens. It is necessary that a door detection sensor 6 perceiving an opening/closing state of the door 4 and the like are attached to limit the operation range of the robot 1 in order to prevent the collision.

In addition, there is also a method in which, for example, the robot 1 grips the door 4 with the end effector 2 to directly open the door 4 without using the actuator such as the air cylinder 3. This case does not require the actuator for opening and closing the door. However, a motion of opening and closing the door 4 is added so that it takes more time for the robot 1 to exchange the workpiece 13, and thus efficiency is decreased. This case also has a possibility that the erroneous operation occurs or the robot 1 is failed to open and close the door 4, and thus it is necessary that the door detection sensor 6 perceiving the opening/closing state of the door 4 and the like are attached to limit the operation range of the robot 1 in order to reduce the risk that the robot 1 collides with the door 4.

SUMMARY OF THE INVENTION

In this regard, the invention has been made in consideration of the above problem of the relate art, and an object thereof is to provide a cover structure of a robot in which the robot can be protected from a generation source of a contamination material to contaminate the robot by fixing the cover to a movable portion of the robot.

In a cover structure of a robot according to the invention, the robot includes two or more movable portions, is stored in a cover, and is mounted with an end effector in any one of the two or more movable portions. The cover is fixed to any one of the movable portions other than the movable portion mounted with the end effector among the two or more movable portions, and has a cover opening portion where the end effector is capable of passing.

According to the invention, a position or a direction of the cover can be optionally changed through a posture of the robot by fixing the cover to the movable portion of the robot. The cover can be disposed in a position or a direction for protecting the robot therefrom since the generation source of the chip or the cutting liquid is determined.

The robot may be a vertical articulated robot. The robot is the vertical articulated robot so that the robot has a high freedom degree of operation range, and the position or the direction of the cover is changed in a wide range.

The cover may be attached to a rotating axis as the movable portion of a base portion of the vertical articulated robot. The cover having an opening portion is attached to the rotating axis (axis J1) of the base portion of the robot so that a relative relation of the opening portion with respect to axes (axes J2 to J6) above the axis J1 is not changed, and thus the robot can operates in a wide range without an interference with the cover.

The cover may have a rotationally symmetric shape having substantially the same center as a rotational center of the rotating axis, a fixed wall may be disposed outside a rotation trajectory of the cover, the fixed wall may include a fixed wall opening portion, and the cover may be disposed so as to block the fixed wall opening portion. According to the invention, the fixed wall is disposed outside the rotationally-symmetric shaped cover, and thus the area where the robot operates can be freely selected among the plurality of areas separated by the fixed wall through the angle of the rotating axis (J1).

The fixed wall may be formed of at least one surface extending radially from substantially the same central axis as the rotational center of the rotating axis, and the cover opening portion may face any one of a plurality of areas partitioned by the surface. According to the invention, an area is partitioned into only two areas in a case where the fixed wall is a simple plan surface, but the area can be partitioned into three or more areas in the case of a radial-shaped wall. For example, the area can be partitioned into four areas when the four fixed walls are disposed at intervals of a ninety degree angle radially with respect to the rotating axis. The radial-shaped fixed wall can allow the operation range of the robot to widen with respect to the rotation angle of J1. For example, when a cover 20 has a cylindrical shape, and the opening portion of the cylindrical surface thereof has a thirty degree angle, the operation can be performed in ±30 freedom degrees of the rotating axis J1 in each area partitioned at intervals of the ninety degree angle, and the area is separated from the other areas, where the operation is not performed during the operation, by the fixed wall 5 and the cover 20.

Another cover blocking the cover opening portion may be attached to a movable portion other than the movable portion attached with the cover. According to the invention, the another cover serving as a lid of the cover opening portion is attached to the movable portion of the robot, and thus the lid (another cover) can be opened and closed according to the posture of the robot.

According to the invention, the cover structure of the robot can be provided in which the robot can be protected from the generation source of the contamination material to contaminate the robot by fixing the cover to the movable portion of the robot.

BRIEF DESCRIPTION OF THE DRAWINGS

The above object, other objects, and features of the invention will become clear through the description of the following embodiments with reference to the accompanying drawings as follows.

DETAILED DESCRIPTION OF THE PREFERRED EMBODIMENTS

Hereinafter, embodiments of the invention will be described with reference to the drawings.

Figure 2:
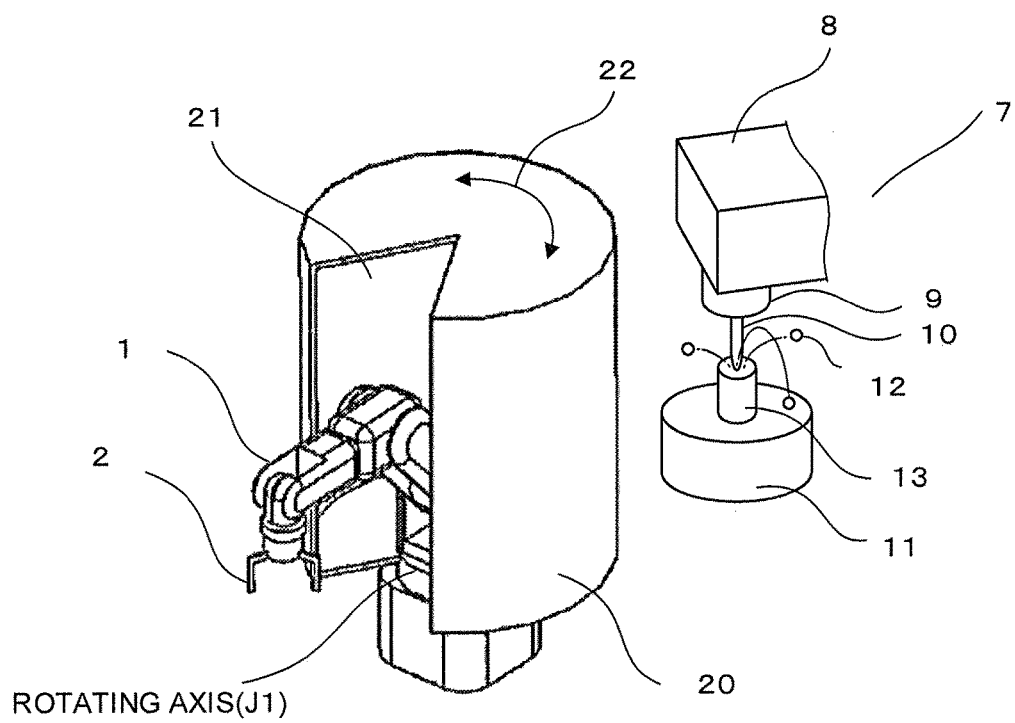
FIG. 2 is a diagram illustrating an embodiment in which the robot can be protected from a chip or a cutting liquid scattered from a back surface.

FIG. 2 illustrates an embodiment of the invention. A robot 1 is a vertical articulated robot having six axes (J1 to J6), and has a configuration in which a cover 20 is fixed to a rotating axis (J1) in the base portion of the robot, and the cover 20 is concomitantly rotated (see an arrow 22) when the rotating axis J1 is rotated.

A cover opening portion 21 is provided in the cover 20, and an end effector 2 can be taken outside the cover 20 through the cover opening portion 21. The robot 1 can be protected from a chip or a cutting liquid scattered from a back surface since the back surface of the robot 1 is constantly covered with the cover 20 in this structure. The cover 20 has a rotationally symmetric shape with respect to the central axis of the rotating axis J1 except for the cover opening portion 21.

The cover opening portion 21 is minimized to such a degree as not to largely limit the operation range of the robot so that the cover 20 protects the robot 1 even when the rotating axis J1 is rotated in a certain degree. The cover 20 is fixed to the rotating axis J1 in the case of this structure, and thus the collision between the cover 20 and the robot 1 cannot occur however quickly the rotating axis J1 is rotated. Further, the relative position between the rotating axes J2 to J6 and the cover 20 is constantly maintained, and thus the collision with the cover 20 does not occur in principle when the operation range of the rotating axes J2 to J6 with respect to the cover 20 is determined.

Figure 3A:
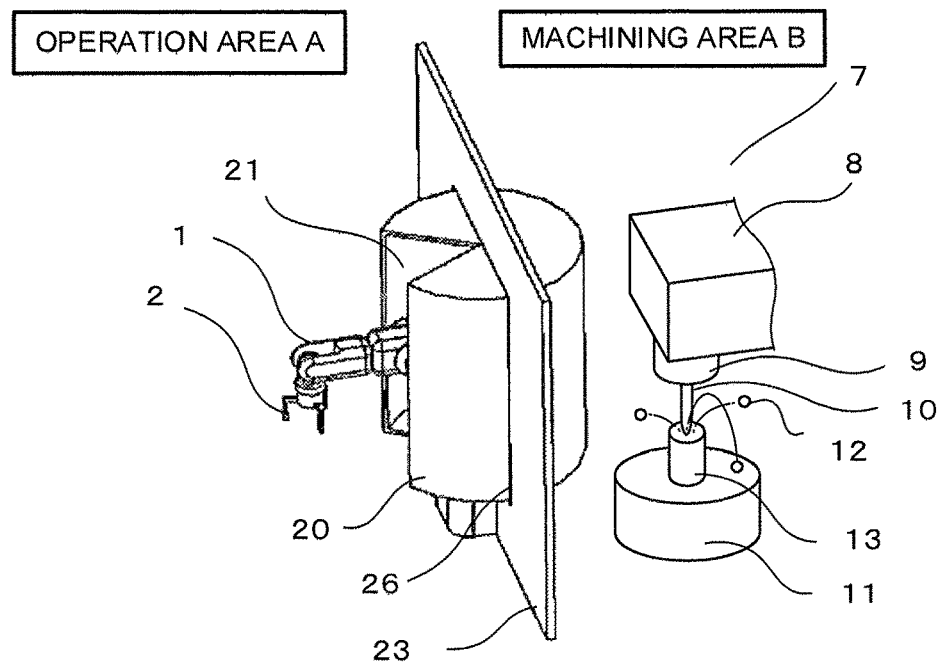
FIG. 3A is a diagram illustrating a state where the robot is operated on an operation area A side in a configuration illustrated in FIG. 2.
Figure 3B:
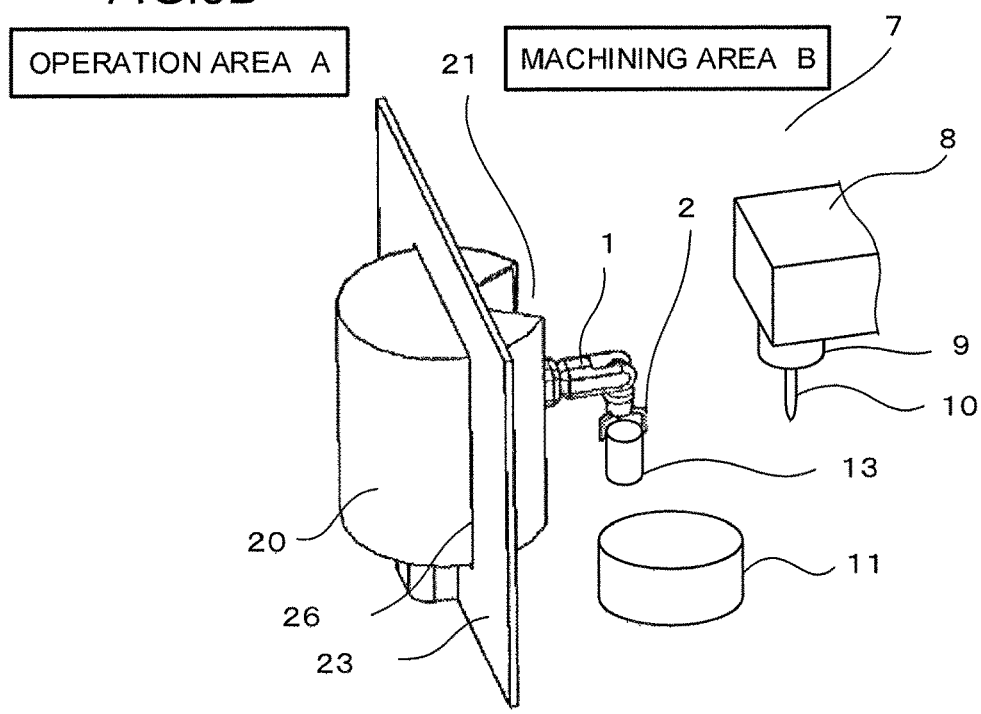
FIG. 3B is a diagram illustrating a state where the robot is operated on a machining area B side in the configuration illustrated in FIG. 2.

FIGS. 3A and 3B are diagrams illustrating an embodiment in which the structure of FIG. 2 is further provided with a fixed wall. FIG. 3A illustrates a state where the robot 1 is operated on an operation area A side, and FIG. 3B illustrates a state where the robot 1 is operated on a machining area B side.

The cover 20 has a substantial cylindrical shape (rotationally symmetric shape), the central axis of the cylinder substantially matches the rotational center of the axis J1, a fixed wall 23 is disposed outside the rotation trajectory of the cover 20, and the cover 20 is disposed inside a fixed wall opening portion 26 of the fixed wall 23. That is, the cover 20 is disposed to block the fixed wall opening portion 26. This structure makes the rotation trajectory, which is drawn by the cover 20 while the rotating axis J1 rotates, be substantially constant, the fixed wall 23 is present outside the cover with a slight gap interposed therebetween, and thus the operation area A and the machining area B can be separated with a sufficiently small gap. That is, the intrusion of the chip or the cutting liquid from the machining area B of a machine tool 7 to the operation area A of the robot 1 can be minimized. Therefore, the structure of FIG. 3 has a function as a cover to protect the robot 1 completely similarly to the conventional opening/closing door (door 4) of FIG. 1.

Figure 1A:
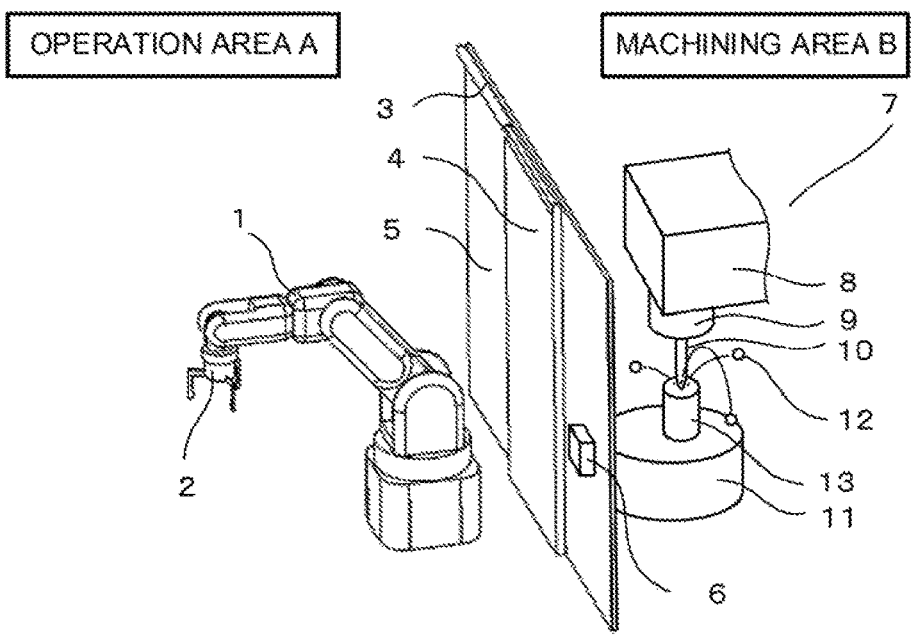
FIG. 1A is a diagram illustrating a robot which automatically exchanges a workpiece of a machine tool and a structure of a door which is automatically opened and closed, and a diagram illustrating a state where an automatic door is closed.
Figure 1B:
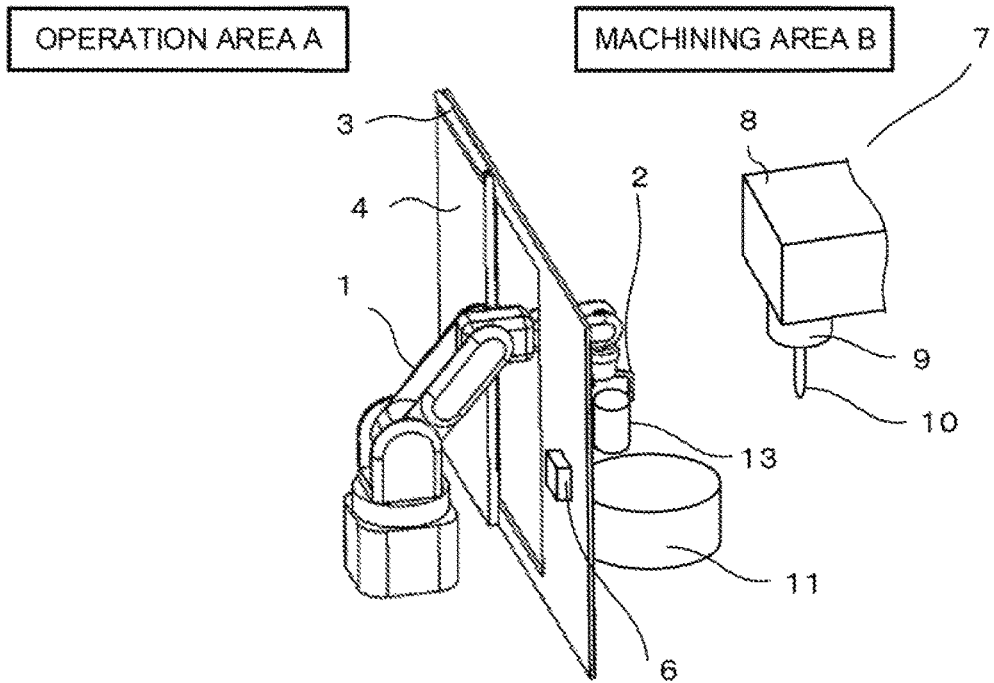
FIG. 1B is a diagram illustrating the robot which automatically exchanges the workpiece of the machine tool and the structure of the door which is automatically opened and closed, and a diagram illustrating a state where the automatic door is opened.

The conventional structure of FIGS. 1A and 1B requires an actuator which opens and closes a door 4 or a sensor which detects whether the door is opened or closed. Meanwhile, in the structure of FIGS. 3A and 3B, the area where the cover opening portion 21 of the cover 20 faces between the operation area A and the machining area B is determined by the angle of the rotating axis J1, and thus the area where the cover opening portion 21 presently faces is constantly apparently known from the angle of the rotating axis J1. Therefore, the cover 20 can perform a function to open and close the door 4 without an additional actuator and sensor.

The robot 1 takes a posture in which the end effector 2 is present inside the cover 20 when the rotating axis J1 is rotated to switch the operation area (operation area A and machining area B) of the robot 1, and thus it is prevented that the collision with the fixed wall 23 occurs. Therefore, whether the collision occurs can be found out from only the posture of the robot 1, and thus the collision with the fixed wall 23 can be also avoided without using an additional sensor when the operation range is set by a control device (not illustrated) of the robot 1.

Figure 4A:
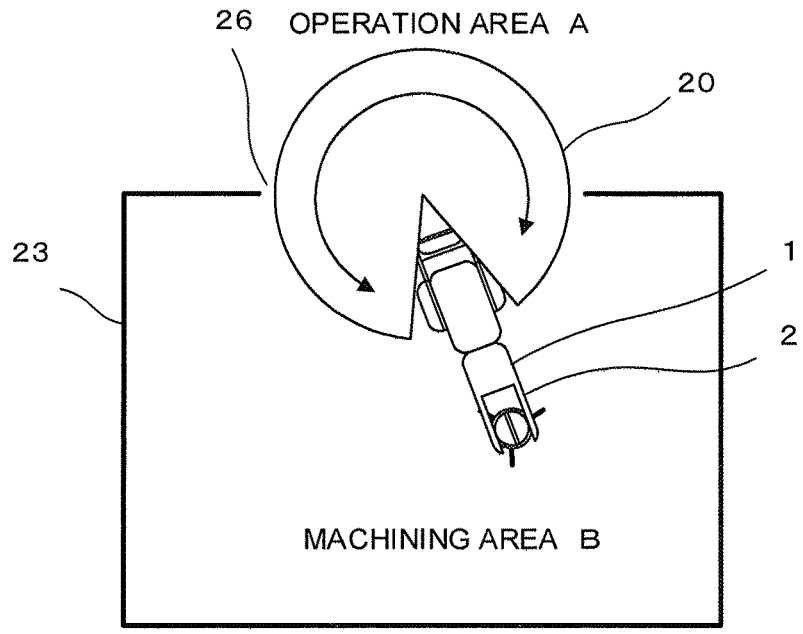
FIG. 4A is a diagram illustrating a cover structure of the robot when viewed from a top in a state where an area in the configuration illustrated in FIGS. 3A and 3B is partitioned into two areas.
Figure 4B:
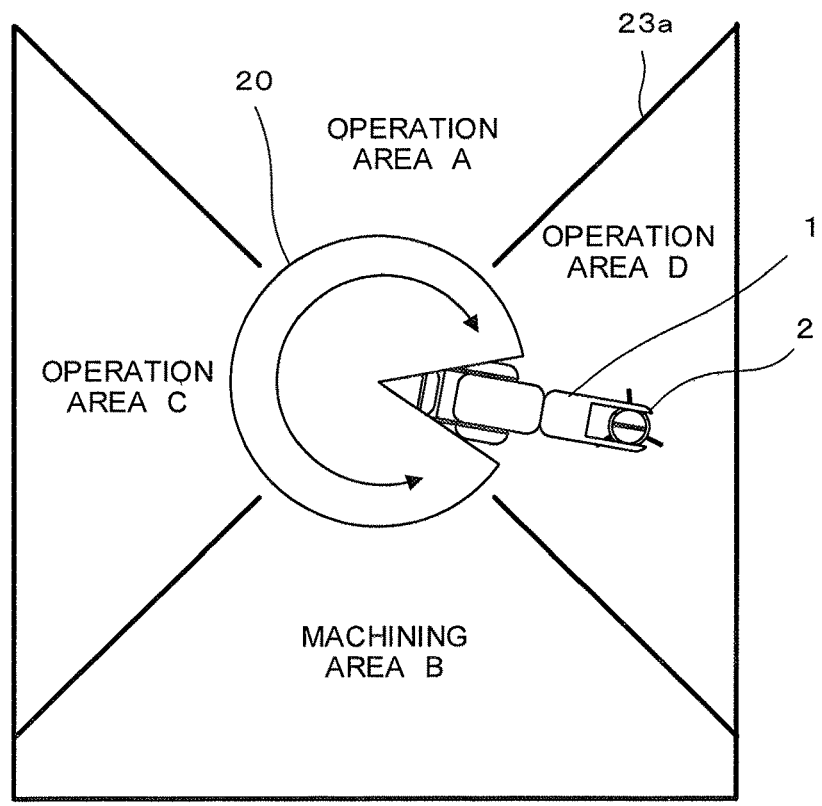
FIG. 4B is a diagram illustrating a cover structure of the robot when viewed from a top in a state where the area in the configuration illustrated in FIGS. 3A and 3B is partitioned into four areas.

FIG. 4 illustrates an embodiment of the invention having configuration of partitioning an area. FIG. 4A is a schematic diagram when viewed from the top of FIG. 3, and in the structure of FIG. 4, the fixed wall 23 on the machining area B side is closed since the machining area B is generally closed by a mechanic cover. In the structure of this case, the fixed wall 23 partitions the area into two areas, that is, the machining area B and the operation area A. FIG. 4B illustrates a structure in which the operation area A is further partitioned so that the fixed wall 23 partitions the area into four areas, that is, the operation area A, an operation area C, an operation area D, and the machining area B. For example, the operation area A is an area which a workpiece 13 comes out and in, the operation area C is an area where the workpiece 13 is cleaned, and the operation area D is an area where a hand of the robot 1 is exchanged. That is, the areas can be partitioned depending on each purpose of the operation.

The direction of the cover opening portion 21 of the cover 20 is changed according to the rotation angle of the rotating axis J1 to determine the area where the robot 1 operates. The cover opening portion 21 of the cover 20 is desirably minimized to such a degree as not to interrupt the operation of the robot 1 in order that the areas are strictly separated by the cover 20.

For example, in a case where a cleaning liquid is used in high volume in the operation area C of FIG. 4B, there is a concern that the cleaning liquid leaks into the operation area A or the machining area B, and thus it is necessary to store the cover opening portion 21 of the cover 20 in the operation area C during cleaning. On the other hand, a hand exchange in the operation area D is performed with no problem even when the cover opening portion 21 of the cover 20 is positioned between the operation area A and the operation area D since the hand exchange does not cause any scatter.

Herein, a person can approach the operation area A open to the outside with no safety problem as long as the end effector 2 of the robot is present in the operation area D, and thus a surface 23a of the fixed wall between the operation area D and the operation area A is meaningful.

In a case where the areas are partitioned by the rotationally symmetric cover 20, the gap between the fixed wall 23 and the cover 20 can be minimized when the fixed wall 23 extends radially from the rotational center of the cover 20 (the rotational center of the rotating axis J1), which is advantageous in terms of improving the sealability of each area. Further, the wall extending radially secures, particularly, the large rotation range of the rotating axis J1 in each area, which is a merit in terms of securing the large operation range of the robot 1 in each area.

FIGS. 5A to 5E illustrate an embodiment of the invention using two covers. The embodiment illustrated in FIGS. 3A and 3B or FIGS. 4A and 4B has a structure in which the robot 1 is protected from the scattered chip or the cutting liquid by combining the fixed wall 23 and one cover 20, but the structure of FIGS. 5A to 5E is a structure in which the robot is protected by two covers 20 and 25 attached to the robot 1. Incidentally, a cover 24 covers the lower portion of the robot, and is fixed to a floor or the base portion of the robot.

Figure 5A:
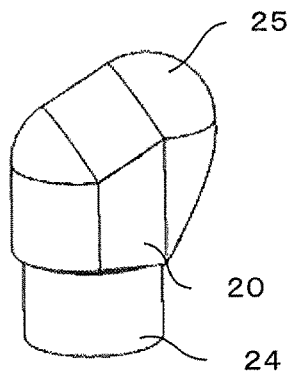
FIG. 5A is a diagram illustrating an embodiment in which the robot is protected by two covers, and is a diagram illustrating a state where the covers are closed.
Figure 5B:
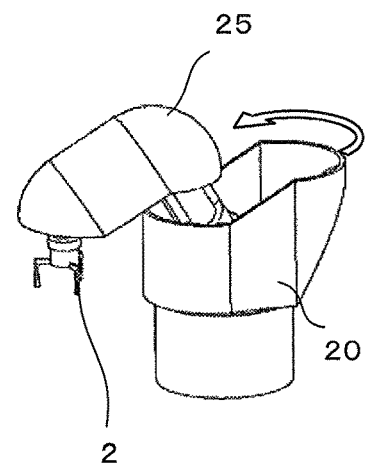
FIG. 5B is a diagram illustrating the embodiment in which the robot is protected by the two covers, and is a diagram illustrating a state where the covers are opened, and an end effector comes outside the covers.
Figure 5C:
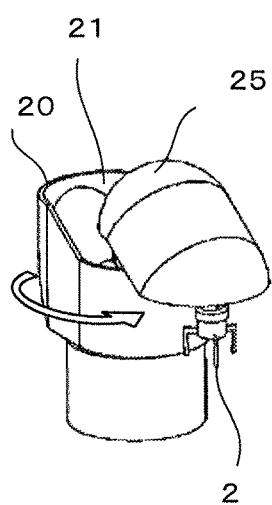
FIG. 5C is a diagram illustrating the embodiment in which the robot is protected by the two covers, and is a diagram illustrating a state where a rotating axis J1 is rotated to change a posture.
Figure 5D:
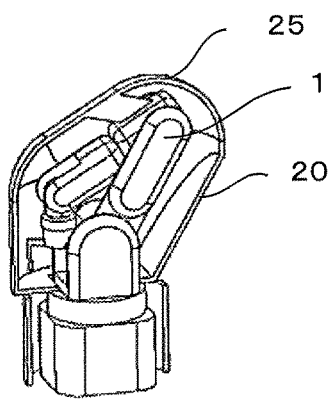
FIG. 5D is a sectional view of FIG. 5A.
Figure 5E:
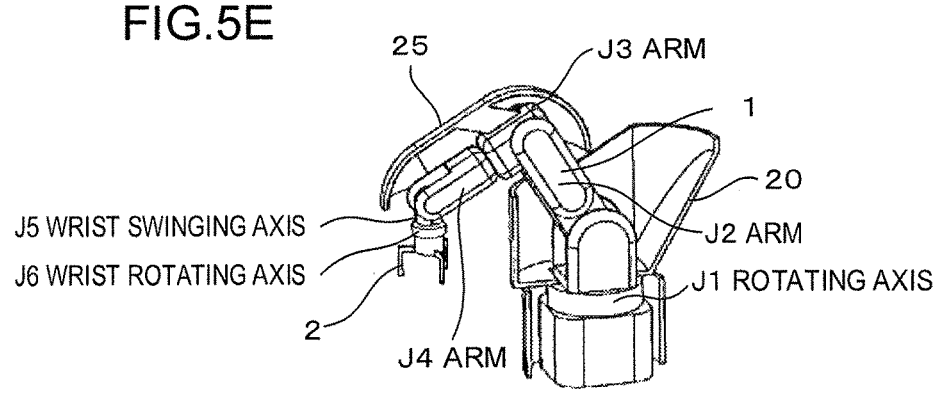
FIG. 5E is a sectional view of FIG. 5B.

FIG. 5A illustrates a state where the cover is closed, FIG. 53 illustrates a state where the cover is opened, and the end effector comes outside the cover, and FIG. 5C illustrates a state where the rotating axis J1 is rotated to change the posture. In addition, FIGS. 5D and 5E are respective sectional views of FIGS. 5A and 53, the cover 20 is fixed to the rotating axis J1 (first movable portion), and a cover 25 is fixed to an arm J3 (second movable portion). A wrist swinging axis J5 is provided in the tip of the arm J3. A wrist rotating axis J6 which rotates a wrist is provided in the wrist swinging axis J5. The end effector 2 is mounted in the wrist rotating axis J6. The end effector 2 is a device which grips the workpiece 13 and the like.

In this structure, the cover 25 has a shape of blocking the opening portion 21 of the cover 20, and the joint surface of the cover 20 is joined to the joint surface of the cover 25 without a gap so that the cover of the robot 1 becomes in a closed state when the robot 1 takes a posture of FIGS. 5A and 5D. Since the cover is closed, the chip or the cutting liquid is not splashed on the robot 1 even when the robot 1 is disposed in the machining area B. The two covers 20 and 25 are used for the sealing in FIGS. 5A to 5E, but three of more covers may be used for the sealing in combination.

Unlike the structure of FIGS. 3A and 3B or FIGS. 4A and 4B, the robot 1 in the structure of FIGS. 5A to 5E cannot be operated in a state where the covers 20 and 25 are closed since the posture of the robot 1 is determined. However, the cover of the robot 1 can be compactly formed so that the robot 1 can be disposed in a narrow space in the machining area B, and further, the distance between the workpiece 13 and the robot 1 becomes smaller, and thus there is a merit that the workpiece 13 can be automatically exchanged by a smaller size of robot 1.

According to the invention, a cover structure of the robot can be provided in which the robot can be protected from a generation source of a contamination material to contaminate the robot by fixing the cover to the movable portion of the robot. More specifically, the cover is opened and closed by a motion of each axis of the robot since the cover is attached to the movable portion of the robot. Therefore, it is not necessary to additionally prepare the actuator to open and close the cover. In addition, the cover is attached to the robot itself unlike the case of opening and closing the door. Therefore, when the operation range of the robot is set in advance, it is prevented that an erroneous operation causes the robot to collide with the cover, and the collision does not occur however quickly the operation is performed.

The invention claimed is:

1. A robot system including:
a robot, including a movable arm mounted to a movable base, and an end effector mounted to the movable arm; and
a cover structure including:
a first cover fixed to the movable base and separate from the movable arm and the end effector, the first cover defining a cavity at least partially enclosing the movable arm and the end effector, and having a cover opening portion where the end effector is capable of passing through, and
a second cover fixed to the movable arm of the robot, the second cover configured to block the cover opening portion without a gap to enclose the robot inside the first cover and the second cover.

2. The robot system according to claim 1, wherein the robot is a vertical articulated robot.

3. The robot system according to claim 2, wherein the first cover is rotatable along a rotating axis.

4. The robot system according to claim 3, wherein the first cover is mounted on a floor on which the robot is installed.

* * * * *